W. H. BONNELL.
Lantern.
No. 4,332. Reissued April 11, 1871.
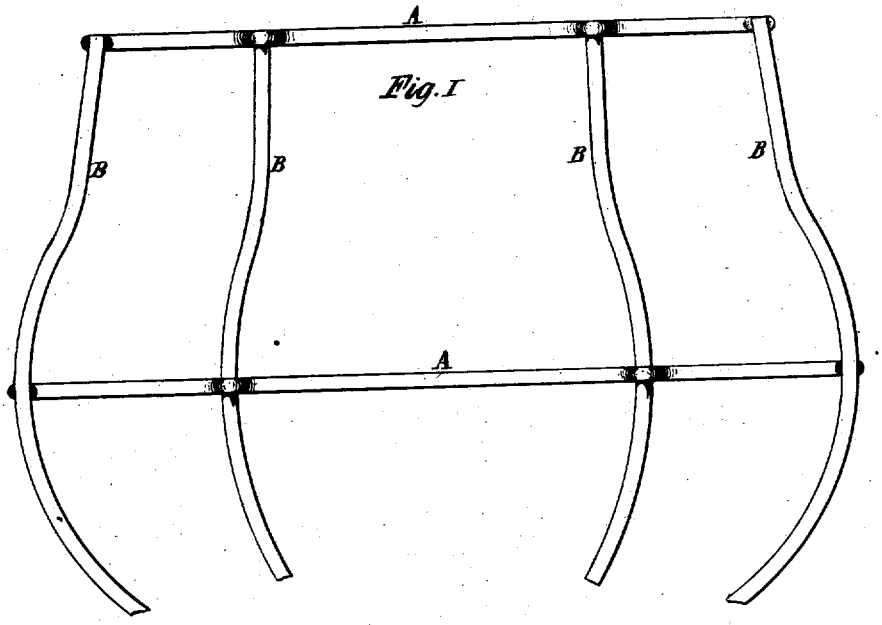
Fig. II.
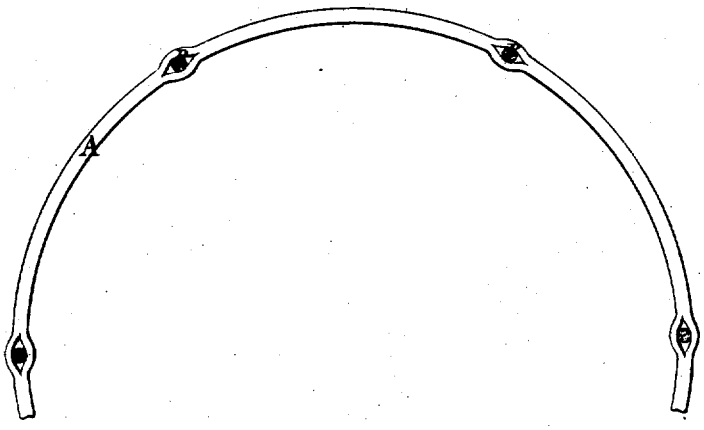
Jno. J. Bonner
George F. Metzger
Witnesses
Wm. H. Bonnell Inventor
by Jay Hyatt
N. PETERS, Photo-Lithographer, Washington, D. C.

United States Patent Office.

WILLIAM H. BONNELL, OF BUFFALO, NEW YORK, ASSIGNOR TO HIMSELF AND HORACE PARMELEE, OF SAME PLACE.

Letters Patent No. 96,772, dated November 16, 1869; reissue No. 4,332, dated April 11, 1871.

DIVISION B.

IMPROVEMENT IN LANTERNS.

The Schedule referred to in these Letters Patent and making part of the same.

I, WILLIAM H. BONNELL, of the city of Buffalo, in the county of Erie and State of New York, have invented a certain Improvement in Lanterns, of which the following is a specification.

My invention relates to the manner of connecting, at the point of intersection, the wires of the guard or frame which surrounds the glass globe of a lantern.

The invention consists of a guard or wire frame, when the vertical and horizontal wires thereof are united, by slitting the one, and then passing the other through the slot thus formed and securing it in place by solder, thereby forming a strong, neat, and comparatively cheap, connection.

In the accompanying drawing—

Figure I is a vertical section of the wire guard of a lantern.

Figure II is a plan thereof.

Like letters refer to like parts in each of the figures.

A A represent the wires forming the two horizontal rings of the guard, and

B B are the vertical wires thereof.

In the drawing the wires A A are shown pierced by holes, formed by longitudinal slits at the required distance apart, and the vertical wires represented as passing through these holes, in which they are secured by solder applied at the point of intersection.

The slits may, however, be made in the vertical wires, and the horizontal wires secured therein, as desired.

I claim as my invention—

The wires A B, when secured together by passing one wire through the other and soldering in place, as hereinbefore set forth.

W. H. BONNELL.

Witnesses:

JNO. J. BONNER,

JAS. MCCARTY.